United States Patent [19]
Davis

[11] Patent Number: 5,917,573
[45] Date of Patent: Jun. 29, 1999

[54] OPTICAL DEVICE FOR AIDING COLOR-BLIND PERSONS IN DISTINGUISHING COLORED OBJECTS

[76] Inventor: James Kenneth Davis, P.O. Box 269, Kingston, Tenn. 37763

[21] Appl. No.: 08/978,904

[22] Filed: Nov. 26, 1997

[51] Int. Cl.⁶ ....................................................... G02C 7/16
[52] U.S. Cl. .............................. 351/46; 351/158; 351/165
[58] Field of Search .................................. 351/41, 44, 45, 351/163, 165, 46, 158, 232, 233, 242

[56] References Cited

U.S. PATENT DOCUMENTS

| | | | |
|---|---|---|---|
| 3,586,423 | 6/1971 | Zeltzer | 351/39 |
| 3,731,993 | 5/1973 | Piringer | 351/165 |
| 4,300,819 | 11/1981 | Taylor | 351/41 |
| 4,998,817 | 3/1991 | Zeltzer | 351/162 |
| 5,408,278 | 4/1995 | Christman | 251/44 |

*Primary Examiner*—Huy Mai
*Attorney, Agent, or Firm*—Joseph A. Marasco

[57] ABSTRACT

A device for aiding a color blind person in the distinguishing of colors includes at least two lenses of different colors disposed so that an object may be simultaneously viewable through each of the lenses by one eye of the person.

5 Claims, 1 Drawing Sheet

OPTICAL DEVICE FOR AIDING COLOR-BLIND PERSONS IN DISTINGUISHING COLORED OBJECTS

FIELD OF THE INVENTION

The present invention relates to devices for aiding color-blind persons in the identification of specific colors to which they are blind, and more particularly to such devices which employ lenses of known color through which said persons can view an object and thus distinguish the color thereof.

BACKGROUND OF THE INVENTION

Color-blind persons (persons having various inabilities to distinguish colors) are often unable to reliably distinguish colors of various objects (colored objects, lights, indicia, etc.) wherein the color thereof is important or even critical to accurate interpretation of the object. Common examples of such objects include lighted and non-lighted signals, indicators and signs used for controlling vehicle, pedestrian and air traffic, for operating household, industrial and transportation equipment, and any source of light and/or other visual information wherein color is important or even critical to accurate interpretation of the information.

Vehicle drivers who are color-blind generally rely on indications other than color such as the relative positions of traffic signal lights (not always standardized and therefore not to be ubiquitously trusted) or the movement of other traffic. Aircraft pilots who are color-blind are not permitted to fly during hours of darkness because the ability to distinguish colors is considered critical to the accurate interpretation of lighted, colored signals and markers at airports. Operators of equipment having indicators wherein color thereof has significance must rely on labels or other aids to interpret the significance of lighted signals.

U.S. Pat. No. 4,300,819 to D. E. Taylor describes eyeglasses for distinguishing colors using one colored and one clear lens. Such a device is limited in effectiveness in that only one color can be distinguished. Moreover, such a method is not generally effective for persons with significant visual acuity in only one eye. See also U.S. Pat. No. 3,586,423.

U.S. Pat. No. 4,998,817 to H. I. Zeltzer describes a corneal contact lens for the distinguishing of colors, which is clear except for a thin red exterior layer covering the area admitting light to the pupil. Such a device is also limited in effectiveness in that only one color can be distinguished, and it is not generally effective for persons with significant visual acuity in only one eye.

OBJECTS OF THE INVENTION

Accordingly, it is an object of the present invention to provide a new apparatus and method for enabling a color-blind person to distinguish at least two colors which that person could not ordinarily distinguish.

Further and other objects of the present invention will become apparent from the description contained herein.

SUMMARY OF THE INVENTION

In accordance with one aspect of the present invention, the foregoing and other objects are achieved by a device for aiding a color blind person in the distinguishing of colors includes at least two lenses of different colors disposed so that an object may be simultaneously viewable through each of the lenses by one eye of the person.

In accordance with another aspect of the present invention, an eyeglass lens adapted for aiding a color blind person in the distinguishing of colors comprising at least two lenses of different colors disposed on said eyeglass lens so that an object may be simultaneously viewable through each of said at least two lenses by one eye of said person.

For a better understanding of the present invention, together with other and further objects, advantages and capabilities thereof, reference is made to the following disclosure and appended claims in connection with the above-described drawings.

DETAILED DESCRIPTION OF THE INVENTION

The present invention is a device and method for use by color-blind persons in order to distinguish selected colors. The present invention is useful for distinguishing the colors of objects as described hereinabove, especially signals wherein color is of importance such as vehicle traffic signals, airport control tower light signals, etc. The present invention is especially suitable for distinguishing between red, yellow and green vehicle traffic signals, and for distinguishing between red, white and green light signals used at airport control towers for controlling aircraft traffic which is not radio-equipped, or in case of radio failure.

Figure 1:
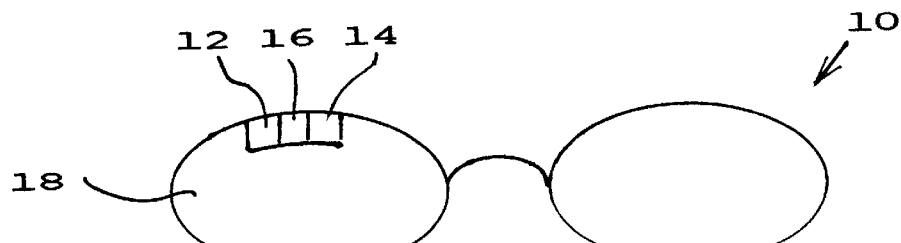
FIG. 1 shows a device using two colored lenses separated by an aiming lens in accordance with the present invention in combination with eyeglasses.
Figure 2:
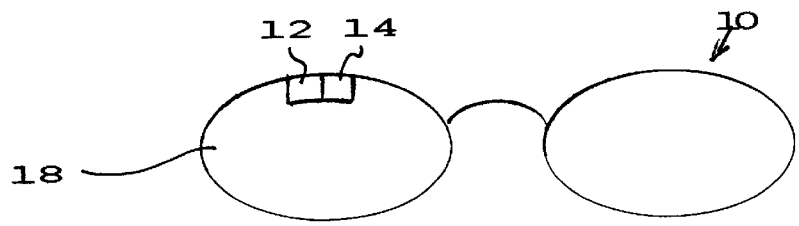
FIG. 2 shows a device using two adjacent colored lenses in accordance with the present invention in combination with eyeglasses.

FIGS. 1 and 2 show a device in accordance with the present invention in combination with eyeglasses 10. At least two different colored, transparent eyeglass lenses 12, 14 are attached to the top of one lens 18. The colored lenses 12, 14 are optionally separated by a colorless transparent aiming lens 16 which can also be a space or aperture. Any of the lenses 12, 14, 16 can be a selected portion of a larger lens. The aiming lens is optional because some users of the invention may prefer the use of an aiming lens, while other users may prefer the absence of an aiming lens.

The color of the transparent colored lenses 12, 14 are selected on the basis of the colors which are to be distinguished. For example, in the case of distinguishing the color of traffic signals, one colored transparent lens 12 should be colored green and the other colored, transparent lens 14 should be colored red. Relative position of one color or another is not critical to the invention; the order of the colors can be reversed from the described above.

The device can be permanently affixed to at least one lens 18 of the eyeglasses 10 as shown in FIG. 1. The device can also be removable, or can be hingably, retractably, or otherwise movably disposed in order to facilitate stowing wherein the device may be positioned outside the person's field of view. Such an arrangement is useful for eliminating or at least reducing distraction therefrom when the device is not in use.

Figure 3:
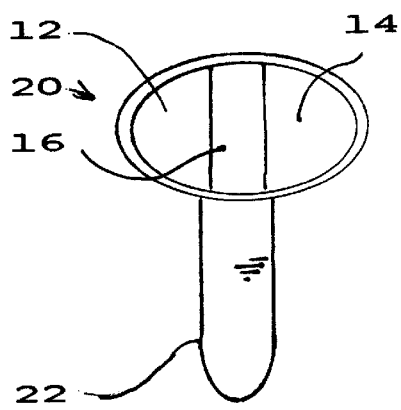
FIG. 3 shows a hand held device using two colored lenses separated by an aiming lens in accordance with the present invention.

FIG. 3 shows a hand-held device comprising a frame 20 having a handle 22. The colored, transparent lenses 12, 14 and colorless transparent lens 16 are mounted in the frame 20 via conventional means. This embodiment is particularly useful to those color blind persons who do not normally wear eyeglasses. As previously stated, the aiming lens 16 is optional.

In other embodiments of the present invention, the above described device can be attached to an automobile, aircraft, or other vehicle at a convenient location such as a windshield. The present invention can be embodied in any suitable support structure and in any suitable disposition for use in distinguishing colors, A key feature of the invention is the use of at least two small areas of two different colors are utilized, preferably simultaneously, to distinguish colors.

Figure 4:
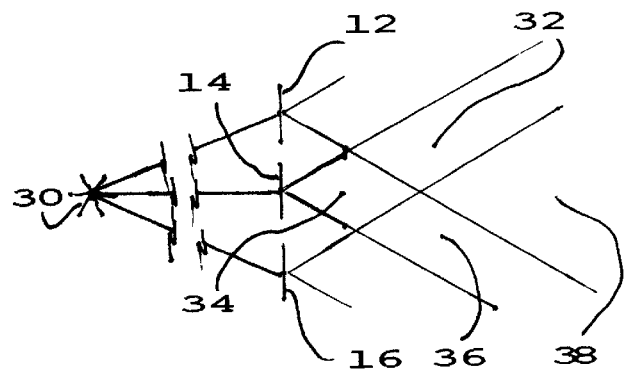
FIG. 4 shows overlap of image areas in accordance with an embodiment of the present invention.

To use the present invention, the color-blind person places himself and the device in alignment such that the colored subject to be distinguished is viewed through the device. The device can be configured so that a viewer can view an object simultaneously through each of the three lenses 12, 14, 16. Each of the three lenses 12, 14, 16 can be slightly concave on one or both sides, prismatic, canted, or otherwise modified to slightly refract light, and optically arranged so that the image areas overlap at the eye of the viewer, as shown in FIG. 4. For example, light from an object 30 passes through slightly concave lenses 12, 14, 16, where the light is refracted into broadening image regions 32, 34, 36. The image regions 32, 34, 36 overlap in an overlap region 38. When a person's eye is placed in the overlap region, the eye can see all three images of the object 30 at the same time, enabling more rapid distinguishing of the color thereof. If an aiming lens 14 is not used in an embodiment of the invention, image regions 32, 36 are considered to overlap in the overlap region 38.

The purpose of the aiming lens is to aid the person in aiming the device. However, as stated above and shown in FIG. 2, the device can be constructed without the colorless transparent aiming lens 16, with the colored lenses 12, 14 being directly adjacent one another. Aiming is accomplished by placing the eye in alignment with the overlap region 38.

Colors are distinguished by differential intensity through the colored lenses 12, 14. For example, if the object is visible at the same intensity through both red and green lenses, the subject light is most likely to be yellow or white. If the subject light is visible at a greater intensity through the red lens, it is most likely to be red. If the subject light is visible at a greater intensity through the green lens, it is most likely to be green.

Other lens colors can be used to distinguish between other colors, such as blue (taxiway), white (runway), and red (obstruction) lights on a lighted airport.

This invention permits color-blind persons to drive with a greater degree of safety, and may provide means by which color-blind aircraft, pilots can be licensed to fly during hours of darkness.

Equipment and control-room operators who are color-blind can more reliably and more quickly identify alarm and indicator lights, and thus improve the likelihood of making correct responses and reduce the time required for recognition and response.

While there has been shown and described what are at present considered the preferred embodiments of the invention, it will be obvious to those skilled in the art that various changes and modifications can be made therein without departing from the scope of the inventions defined by the appended claims.

What is claimed is:

1. A device for aiding a color blind person in the distinguishing of color of an object comprising at least two lenses of different colors disposed and optically aligned so that an object may be simultaneously viewable through each of said at least two lenses by one eye of said person.

2. A device in accordance with claim 1 wherein said at least two lenses are separated by a colorless aiming lens.

3. An eyeglass lens adapted for aiding a color blind person in the distinguishing of colors comprising an eyeglass lens having at least two lenses of different colors disposed thereon so that an object may be simultaneously viewable through each of said at least two lenses by one eye of said person said at least two lenses covering only a portion of said eyeglass lens.

4. An eyeglass lens in accordance with claim 3 wherein said at least two lenses are configured to permit the object to be viewed through said at least two lenses simultaneously.

5. An eyeglass lens in accordance with claim 3 wherein said at least two lenses are separated by a colorless aiming lens.

\* \* \* \* \*